US012763415B2

(12) United States Patent
Huang et al.

(10) Patent No.: US 12,763,415 B2
(45) Date of Patent: Oct. 13, 2026

(54) NEGATIVE ELECTRODE SHEET AND METHOD FOR PREPARING THE SAME, SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Caixia Huang, Ningde (CN); Shaobing Ge, Ningde (CN); Minghao Tang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 644 days.

(21) Appl. No.: 18/197,719

(22) Filed: May 16, 2023

(65) Prior Publication Data

US 2023/0291043 A1 Sep. 14, 2023

Related U.S. Application Data

(63) Continuation of application No. PCT/CN2021/129346, filed on Nov. 8, 2021.

(51) Int. Cl.
*H01M 50/198* (2021.01)
*H01M 4/134* (2010.01)
(Continued)

(52) U.S. Cl.
CPC ......... *H01M 50/198* (2021.01); *H01M 4/134* (2013.01); *H01M 4/1395* (2013.01); *H01M 50/184* (2021.01); *H01M 2220/20* (2013.01)

(58) Field of Classification Search
CPC .. H01M 50/198; H01M 50/184; H01M 4/134; H01M 4/1395; H01M 4/0404;
(Continued)

(56) References Cited

U.S. PATENT DOCUMENTS

| | | | |
|---|---|---|---|
| 5,981,107 | A | 11/1999 | Hamano et al. |
| 6,225,010 | B1 | 5/2001 | Hamano et al. |

(Continued)

FOREIGN PATENT DOCUMENTS

| | | | |
|---|---|---|---|
| CN | 102683639 | A | 9/2012 |
| CN | 103199217 | B | 6/2015 |

(Continued)

OTHER PUBLICATIONS

Extended European Search Report issued Oct. 30, 2024 in European Patent Application No. 21963026.6.

(Continued)

*Primary Examiner* — Aiqun Li
(74) *Attorney, Agent, or Firm* — XSENSUS LLP

(57) ABSTRACT

A negative electrode sheet may comprise a negative electrode current collector and a negative electrode film layer, at least one surface of the negative electrode current collector may be superposedly provided with two or more negative electrode film layers, adjacent negative electrode film layers may be bonded at a plurality of bonding points by a conductive adhesive having a raised structure, and there may be a gap between the adjacent negative electrode film layers at non-bonding points.

21 Claims, 3 Drawing Sheets

(51) Int. Cl.
*H01M 4/1395* (2010.01)
*H01M 50/184* (2021.01)

(58) Field of Classification Search
CPC .... H01M 4/133; H01M 4/1393; H01M 4/366; H01M 2220/20; H01M 2004/027; H01M 10/0525; Y02E 60/10
See application file for complete search history.

(56) References Cited

U.S. PATENT DOCUMENTS

| | | | |
|---|---|---|---|
| 6,352,797 | B1 | 3/2002 | Yoshida et al. |
| 2019/0181492 | A1 | 6/2019 | Liu et al. |

FOREIGN PATENT DOCUMENTS

| | | | |
|---|---|---|---|
| CN | 105513828 | A | 4/2016 |
| CN | 107403904 | A | 11/2017 |
| CN | 108598365 | A | 9/2018 |
| CN | 108598419 | A | 9/2018 |
| CN | 108807843 | A | 11/2018 |
| CN | 208460853 | U | 2/2019 |
| CN | 109786663 | A | 5/2019 |
| CN | 110010852 | A | 7/2019 |
| CN | 110534789 | A | 12/2019 |
| CN | 111900331 | A | 11/2020 |
| CN | 112290079 | A | 1/2021 |
| CN | 112750979 | A | 5/2021 |
| CN | 112928334 | A | 6/2021 |
| CN | 113036298 | A | 6/2021 |
| TW | 200405604 | A | 4/2004 |

OTHER PUBLICATIONS

International Search Report and Written Opinion mailed on Jun. 23, 2022, received for PCT Application PCT/CN2021/129346, filed on Nov. 8, 2021, 9 pages including English Translation.
Office Action issued May 20, 2026 in Chinese Patent Application No. 202180094451.4 with English translation thereof.

NEGATIVE ELECTRODE SHEET AND METHOD FOR PREPARING THE SAME, SECONDARY BATTERY, BATTERY MODULE, BATTERY PACK, AND ELECTRICAL APPARATUS

CROSS-REFERENCE TO RELATED APPLICATION

The present application is a continuation of International Application No. PCT/CN2021/129346, filed Nov. 8, 2021, which is incorporated herein by reference in its entirety.

TECHNICAL FIELD

The present application relates to the technical field of lithium batteries, and particularly to a negative electrode sheet, a method for preparing the negative electrode sheet, a secondary battery, a battery module, a battery pack and an electrical apparatus.

BACKGROUND ART

In recent years, secondary batteries are more and more widely used in energy storage power source systems such as water power, thermal power, wind power and solar power stations, as well as power tools, electric bicycles, electric motorcycles, electric vehicles, military equipment, aerospace and other fields. Due to the great development of secondary batteries, higher requirements have also been put forward for their energy density, cycle performance and safety performance.

Therefore, it is still an urgent problem to be solved as to taking both better electrochemical performance and safety performance of the batteries into account at the same time.

SUMMARY

The present application has been made in view of the above-mentioned topic, and one of objects thereof is to provide a negative electrode sheet, a method for preparing the negative electrode sheet, a secondary battery, a battery module, a battery pack and an electrical apparatus, in order to solve the technical problems of low infiltration rate of electrolyte solution during battery production, large expansion force during battery cycling, and short battery cycle life.

In order to achieve the above-mentioned object or other objects, a first aspect of the present application provides a negative electrode sheet, comprising a negative electrode current collector and a negative electrode film layer, wherein at least one surface of the negative electrode current collector is superposedly provided with two or more of the negative electrode film layers, adjacent negative electrode film layers are bonded at a plurality of bonding points by a conductive adhesive with a raised structure, and there is a gap between the adjacent negative electrode film layers at non-bonding points.

As a result, the gap between the adjacent negative electrode film layers forms an infiltration channel for electrolyte solution, so that the infiltration rate during battery production is effectively increased, and the rate of lithium intercalation reaction is increased; and at the same time, the gap between the adjacent negative electrode film layers can dissipate part of expansion force, so that the expansion force during battery cycling is reduced, and the battery life is prolonged.

In some embodiments, the height of the raised structure is not greater than the thickness of the negative electrode film layer. As a result, the adjacent negative electrode film layers can be bonded more firmly by the conductive adhesive with the raised structure, so that the adjacent negative electrode film layers are kept from being easily unbonded and falling off, and the stability and safety of battery use are improved.

In some embodiments, the plurality of bonding points are uniformly provided on a surface of the negative electrode film layer. As a result, the adjacent negative electrode film layers can be bonded more uniformly and more firmly by the plurality of bonding points uniformly provided on the surface of the negative electrode film layer, so that the bonding sites are not easily unbonded and detached, and the stability and safety of battery use are improved.

In some embodiments, the spacing between adjacent bonding points along the length direction of the negative electrode film layer is 30-50 mm; and/or the spacing between the adjacent bonding points along the width direction of the negative electrode film layer is 50-100 mm. As a result, the adjacent negative electrode film layers can further be bonded uniformly and firmly, and are not easily unbonded and detached.

In some embodiments, a bonding surface of the conductive adhesive with the raised structure is at least one selected from half-round, round and elliptical; optionally, the diameter or (elliptical) long diameter of the bonding surface of the conductive adhesive with the raised structure is not more than 4 mm. As a result, the bonding firmness of the bonding points can be improved, further ensuring that the adjacent negative electrode film layers are not easily unbonded and detached.

In some embodiments, the width of the gap between the adjacent negative electrode film layers is not greater than the thickness of the negative electrode film layer. As a result, the problem that the adjacent negative electrode film layers are easily unbonded and detached due to the excessive gap width is avoided, and at the same time, the gap width between the adjacent negative electrode film layers is suitable for forming an infiltration channel for electrolyte solution, so that the infiltration rate during battery production is effectively increased, and the rate of lithium intercalation reaction is increased; and also, the gap width between the adjacent negative electrode film layers is suitable for counteracting part of expansion force, so that the expansion force during battery cycling is reduced, and the battery life is prolonged.

In some embodiments, different negative electrode film layers have equal thickness. As a result, the production process is facilitated, and the structural uniformity of the electrode sheet is maintained, so that the infiltration rate for the overall battery can be uniformly increased, the expansion force during battery cycling can be uniformly reduced, and the battery life can be further improved.

In some embodiments, the conductive adhesive comprises an adhesive and a conductive material; optionally, the adhesive is selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS); and optionally, the conductive material is selected from at least one of metal (e. g. silver), graphite, and graphene. As a result, with the conductive adhesive, while maintaining a good conductivity, the adjacent negative electrode film layers can be bonded firmly, and are not easily unbonded and detached.

In some embodiments, the negative electrode sheet further comprises metallic lithium, and the metallic lithium is filled within the gap between the adjacent negative electrode film layers; optionally, the metallic lithium is selected from at least one of a metallic lithium strip, a metallic lithium sheet and a metallic lithium powder. As a result, the lithium intercalation reaction can be accelerated, the occurrence of side reactions can be reduced, and the cycle life of the battery can be prolonged; the metallic lithium is filled within the gap between the adjacent negative electrode film layers, so that air is effectively isolated from the contact reaction with the metallic lithium, and the problem of lithium-rich material failure is solved; and meanwhile, the lithium intercalation reaction takes place inside the electrode sheet, so that the SEI film on the surface of the electrode sheet has consistency, and the cycle life of the battery is improved.

A second aspect of the present application provides a method for preparing a negative electrode sheet, comprising the following steps:

(1) arranging a plurality of bonding points on a negative electrode film layer supported by a negative electrode current collector, and coating a conductive adhesive with a raised structure at the bonding points;

(2) bonding a negative electrode film layer supported by a substrate and the negative electrode film layer supported by the negative electrode current collector under the action of pressure by the conductive adhesive with the raised structure, leaving a gap between the two negative electrode film layers at non-bonding points, and peeling off the substrate to obtain the negative electrode sheet.

As a result, the gap between the adjacent negative electrode film layers in the negative electrode sheet prepared by the method of the present application forms an infiltration channel for electrolyte solution, so that the infiltration rate during battery production is effectively increased, and the rate of lithium intercalation reaction is increased; and at the same time, the gap between the adjacent negative electrode film layers can dissipate part of expansion force, so that the expansion force during battery cycling is reduced, and the battery life is improved.

In some embodiments, steps (1) to (2) are repeated. As a result, a higher energy density is ensured for the battery cell, and also the infiltration of electrolyte solution for the electrode is further improved, the expansion force of the battery is further reduced, and the battery life is further prolonged.

In some embodiments, the height of the raised structure is not greater than the thickness of the negative electrode film layer. As a result, the adjacent negative electrode film layers can be bonded more firmly by the conductive adhesive with the raised structure, so that the adjacent negative electrode film layers are kept from being easily unbonded and falling off, and the stability and safety of battery use are improved.

In some embodiments, the plurality of bonding points are uniformly provided on a surface of the negative electrode film layer. As a result, the adjacent negative electrode film layers can be bonded more uniformly and more firmly by the plurality of bonding points uniformly provided on the surface of the negative electrode film layer, so that the bonding sites are not easily unbonded and detached, and the stability and safety of battery use are improved.

In some embodiments, the spacing between adjacent bonding points along the length direction of the negative electrode film layer is 30-50 mm; and/or the spacing between the adjacent bonding points along the width direction of the negative electrode film layer is 50-100 mm. As a result, the adjacent negative electrode film layers can further be bonded uniformly and firmly, and are not easily unbonded and detached.

In some embodiments, a bonding surface of the conductive adhesive with the raised structure is at least one selected from half-round, round and elliptical; optionally, the diameter or (elliptical) long diameter of the bonding surface of the conductive adhesive with the raised structure is not more than 4 mm. As a result, the bonding firmness of the bonding points can be improved, further ensuring that the adjacent negative electrode film layers are not easily unbonded and detached.

In some embodiments, the width of the gap between the negative electrode film layer supported on the negative electrode current collector and the negative electrode film layer supported on the substrate is not greater than the thickness of the negative electrode film layer. As a result, the problem that the adjacent negative electrode film layers are unbonded and detached due to the excessive gap width is avoided, and at the same time, the gap width between the adjacent negative electrode film layers helps to increase the infiltration rate during battery production, and to increase the rate of lithium intercalation reaction; and also, the gap width between the adjacent negative electrode film layers is suitable for counteracting part of expansion force, so that the expansion force during battery cycling is reduced, and the battery life is prolonged.

In some embodiments, the thickness of the negative electrode film layer supported on the negative electrode current collector is equal to the thickness of the negative electrode film layer supported on the substrate. As a result, the production process is facilitated, and the structural uniformity of the electrode sheet is maintained, so that the infiltration rate for the overall battery can be uniformly increased, the expansion force during battery cycling can be uniformly reduced, and the battery life can be further improved.

In some embodiments, the conductive adhesive comprises an adhesive and a conductive material; optionally, the adhesive is selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS); and optionally, the conductive material is selected from at least one of metal, graphite, and graphene. As a result, with the conductive adhesive, while maintaining a good conductivity, the adjacent negative electrode film layers can be bonded firmly, and are not easily unbonded and detached.

In some embodiments, prior to bonding, metallic lithium is provided at non-bonding points on the negative electrode film layer supported by the negative electrode current collector; optionally, the metallic lithium is selected from at least one of a metallic lithium strip, a metallic lithium sheet and a metallic lithium powder. As a result, the lithium intercalation reaction can be accelerated, the occurrence of side reactions can be reduced, and the formation efficiency can be improved; after lithium intercalation reaction, metallic lithium disappears to form a gap, which helps to increase the infiltration rate of electrolyte solution for the battery and reduce the expansion force during battery cycling; the battery life is prolonged; and the metallic lithium is filled within the gap between the adjacent negative electrode film layers, so that air is effectively isolated from the contact reaction with the metallic lithium, and the problem of lithium-rich material failure is solved; and meanwhile, the lithium intercalation reaction takes place inside the electrode sheet, so that the SEI film on the surface of the electrode sheet has consistency, and the cycle life of the battery is improved.

In some embodiments, the two negative electrode film layers are bonded under the action of 0.1-0.5 Mpa (e. g. 0.3 MPa). As a result, it is possible to ensure that the adjacent negative electrode film layers are firmly bonded, while ensuring that there is a gap of an appropriate width between the adjacent negative electrode film layers at the non-bonding point, so that the infiltration rate of electrolyte solution during battery cycling is increased, and the expansion force during battery cycling is reduced.

In some embodiments, the negative electrode sheet of the first aspect of the present application is prepared by the method of the second aspect of the present application.

A third aspect of the present application provides a secondary battery comprising the negative electrode sheet of the first aspect of the present application or a negative electrode sheet prepared according to the method of the second aspect of the present application.

A fourth aspect of the present application provides a battery module comprising the secondary battery of the third aspect of the present application.

A fifth aspect of the present application provides a battery pack comprising the battery module of the fourth aspect of the present application.

A sixth aspect of the present application provides an electrical apparatus comprising at least one selected from the secondary battery of the third aspect of the present application, the battery module of the fourth aspect of the present application, or the battery pack of the fifth aspect of the present application.

Some embodiments of the present application achieve the following beneficial effects:

The negative electrode sheet in the present application improves the infiltration rate of electrolyte solution during battery production, reduces the expansion force during battery cycling, and improves the cycle life of the battery;

The negative electrode sheet of the present application reduces side reactions in the battery, effectively isolates air from the contact reaction with the metallic lithium to reduce lithium-rich material failure, so that the SEI film on the surface of the negative electrode sheet has consistency, and the cycle life of the battery is improved.

DESCRIPTION OF REFERENCE NUMERALS

Figure 1:
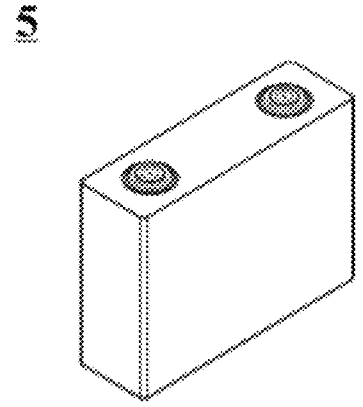
FIG. 1 is a schematic view of a secondary battery according to an embodiment of the present application.

1 Battery pack; 2 Upper box body; 3 Lower box body; 4 Battery module; 5 Secondary battery; 51 Case; 52 Electrode assembly; 53 Cover plate; 6 Negative electrode current collector; 7 Negative electrode film layer; 8 Conductive adhesive; 9 Metallic lithium strip.

DETAILED DESCRIPTION

Hereinafter, embodiments that specifically disclose a negative electrode sheet and a method for preparing a negative electrode sheet, a secondary battery, a battery module, a battery pack, and an electrical apparatus of the present application will be described in detail with reference to accompanying drawings as appropriate. However, there may be cases where unnecessary detailed description is omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

A "range" disclosed in the present application is defined in terms of a lower limit and an upper limit, a given range is defined by selecting a lower limit and an upper limit, and the selected lower and upper limits define the boundary of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is to be understood that the ranges of 60-110 and 80-120 are also contemplated. Additionally, if the minimum range values 1 and 2 are listed, and if the maximum range values 3, 4, and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method comprises steps (a) and (b), meaning that the method may comprise steps (a) and (b) performed sequentially, or may comprise steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "comprise", "comprising", "include" and "including" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B." More particularly, the condition "A or B" is satisfied by any one of the following conditions: A is true (or present) and B is false (or absent); A is false (or absent) and B is true (or present); or both A and B are true (or present).

[Secondary Battery]

Secondary batteries, also known as rechargeable batteries or storage batteries, refer to batteries that, after being discharged, can activate active materials by charging for continuous use.

Typically, a secondary battery comprises a positive electrode sheet, a negative electrode sheet, a diaphragm and an electrolyte solution. During charging and discharging of the battery, active ions (such as lithium ions) are intercalated and deintercalated back and forth between the positive electrode sheet and the negative electrode sheet. The separator is provided between the positive electrode sheet and the negative electrode sheet, and mainly functions to prevent a short circuit between the positive electrode and the negative electrode while allowing active ions to pass through. The electrolyte solution mainly serves to conduct active ions between the positive electrode sheet and the negative electrode sheet.

Negative Electrode Sheet

An embodiment of the present application provides a negative electrode sheet, comprising a negative electrode current collector and a negative electrode film layer, wherein at least one surface of the negative electrode current collector is superposedly provided with two or more (e. g. two) of the negative electrode film layers, adjacent negative electrode film layers are bonded at a plurality of bonding points by a conductive adhesive with a raised structure, and there is a gap between the adjacent negative electrode film layers at non-bonding points. As a result, the gap between the adjacent negative electrode film layers forms an infiltration channel for electrolyte solution, so that the infiltration rate during battery production is effectively increased, and the rate of lithium intercalation reaction is increased; and at the same time, the gap between the adjacent negative electrode film layers can dissipate part of expansion force, so that the expansion force during battery cycling is reduced, and the battery life is prolonged.

In some embodiments, the height of the raised structure is not greater than the thickness of the negative electrode film layer. As a result, the adjacent negative electrode film layers can be bonded more firmly by the conductive adhesive with the raised structure, so that the adjacent negative electrode film layers are kept from being easily unbonded and falling off, and the stability and safety of battery use are improved.

In some embodiments, the plurality of bonding points are uniformly provided on a surface of the negative electrode film layer. As a result, the adjacent negative electrode film layers can be bonded more uniformly and more firmly by the plurality of bonding points uniformly provided on the surface of the negative electrode film layer, so that the bonding sites are not easily unbonded and detached, and the stability and safety of battery use are improved.

In some embodiments, the surface of the negative electrode film layer is rectangular.

In some embodiments, the spacing between adjacent bonding points along the length direction of the negative electrode film layer is 30-50 mm; and/or the spacing between the adjacent bonding points along the width direction of the negative electrode film layer is 50-100 mm. As a result, the adjacent negative electrode film layers can further be bonded uniformly and firmly, and are not easily unbonded and detached.

In some embodiments, a bonding surface of the conductive adhesive with the raised structure is at least one selected from half-round, round and elliptical; optionally, the diameter or (elliptical) long diameter of the bonding surface of the conductive adhesive with the raised structure is not more than 4 mm. As a result, the bonding firmness of the bonding points can be improved, further ensuring that the adjacent negative electrode film layers are not easily unbonded and detached.

In some embodiments, the width of the gap between the adjacent negative electrode film layers is not greater than the thickness of the negative electrode film layer. As a result, the problem that the adjacent negative electrode film layers are easily unbonded and detached due to the excessive gap width is avoided, and at the same time, the gap width between the adjacent negative electrode film layers is suitable for forming an infiltration channel for electrolyte solution, so that the infiltration rate during battery production is effectively increased, and the rate of lithium intercalation reaction is increased; and also, the gap width between the adjacent negative electrode film layers is suitable for counteracting part of expansion force, so that the expansion force during battery cycling is reduced, and the battery life is prolonged.

In some embodiments, at least one surface (e. g. both surfaces) of the negative electrode current collector is (are) superposedly provided with n negative electrode film layers, and $2 \leq n \leq 10$. As a result, a higher energy density is ensured for the battery cell, and also the infiltration rate for the battery is further improved, the expansion force during battery cycling is further reduced, and the battery life is prolonged.

In some embodiments, different negative electrode film layers have equal thickness. As a result, the production process is facilitated, and the structural uniformity of the electrode sheet is maintained, so that the infiltration rate for the overall battery can be uniformly increased, the expansion force during battery cycling can be uniformly reduced, and the battery life can be further improved.

In some embodiments, the conductive adhesive comprises an adhesive and a conductive material; optionally, as an example, the adhesive may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS); and optionally, as an example, the conductive material is selected from at least one of metal (e. g. silver), graphite, and graphene. As a result, with the conductive adhesive, while maintaining a good conductivity, the adjacent negative electrode film layers can be bonded firmly, and are not easily unbonded and detached.

In some embodiments, the content of the adhesive in the conductive adhesive is suitable to provide sufficient adhesion, for example, the weight content of the adhesive in the conductive adhesive is 10%-35%, optionally 14%-30%, such as 19%, 20% and 29%.

In some embodiments, the conductive material may be provided in the form of a slurry containing the conductive material.

In some embodiments, the content of the conductive material in the conductive adhesive is suitable to provide sufficient and good conductivity, for example, the weight content of the conductive material in the conductive adhesive is 50%-80%, such as 60%.

In some embodiments, the conductive adhesive further comprises a functional auxiliary, such as a curing agent, an initiator, a coupling agent, a modified toughening agent, an anti-settling agent, etc. As an example, the curing agent may be an allyl bisphenol A ether, and an aromatic amine. As an example, the initiator may be benzoyl peroxide. As an example, the coupling agent may be a KH-560 silane coupling agent. As an example, the modified toughening agent may be a hyperbranched polyester modified toughening agent. As an example, the anti-settling agent may be a polyamide wax. As an example, the remaining functional auxiliaries may be γ-(2,3-epoxypropoxy) propyltrimethoxysilane and 4-phenylimidazole.

In some embodiments, the negative electrode sheet further comprises metallic lithium, and the metallic lithium is filled within the gap between the adjacent negative electrode film layers; optionally, the metallic lithium is selected from at least one of a metallic lithium strip, a metallic lithium sheet and a metallic lithium powder. As a result, the lithium intercalation reaction can be accelerated, the occurrence of side reactions can be reduced, and the cycle life of the battery can be prolonged; the metallic lithium is filled within the gap between the adjacent negative electrode film layers, so that air is effectively isolated from the contact reaction with the metallic lithium, and the problem of lithium-rich material failure is solved; and meanwhile, the lithium intercalation reaction takes place inside the electrode sheet, so that the SEI film on the surface of the electrode sheet has consistency, and the cycle life of the battery is improved.

In some embodiments, the amount of lithium supplementing between connected negative electrode film layers is 0.005-0.03 g/cm2, optionally 0.01-0.02 g/cm2, calculated based on the area of a one-sided negative electrode film layer.

In some embodiments, both surfaces of the negative electrode current collector are superposedly provided with two negative electrode film layers, respectively.

In some embodiments, no more than 200 bonding points are uniformly provided on the surface of the negative electrode film layer.

In some embodiments, the thickness of the negative electrode film layer is the thickness of a conventional negative electrode film layer in the art.

In some embodiments, the negative electrode current collector may be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE), etc.).

In some embodiments, the negative electrode film layer may be a negative electrode active material known in the art for batteries. For example, the negative electrode active material may include at least one of artificial graphite, natural graphite, soft carbon, hard carbon, silicon-based material, tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer further optionally comprises a conductive agent. As an example, the conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other auxiliaries, for example, a thickener (such as sodium carboxymethyl cellulose (CMC-Na)) and the like.

Method For Preparing Negative Electrode Sheet,

An embodiment of the present application provides a method for preparing a negative electrode sheet, comprising the following steps:

(1) arranging a plurality of bonding points on a negative electrode film layer supported by a negative electrode current collector, and coating a conductive adhesive with a raised structure at the bonding points;

(2) bonding a negative electrode film layer supported by a substrate and the negative electrode film layer supported by the negative electrode current collector under the action of pressure by the conductive adhesive with the raised structure, leaving a gap between the two negative electrode film layers at non-bonding points, and peeling off the substrate to obtain the negative electrode sheet.

As a result, the gap between the adjacent negative electrode film layers in the negative electrode sheet prepared by the method of the present application forms an infiltration channel for electrolyte solution, so that the infiltration rate during battery production is effectively increased, and the rate of lithium intercalation reaction is increased; and at the same time, the gap between the adjacent negative electrode film layers can dissipate part of expansion force, so that the expansion force during battery cycling is reduced, and the battery life is improved.

In some embodiments, the substrate may be a high molecular material, for example polypropylene (PP), polyethylene terephthalate (PET), polybutylene terephthalate (PBT), polystyrene (PS), polyethylene (PE) and the like.

In some embodiments, steps (1) to (2) are repeated. A higher energy density is ensured for the battery cell, and also the infiltration of electrolyte solution for the electrode is further improved, the expansion force of the battery is further reduced, and the battery life is further prolonged.

In some embodiments, the negative electrode film layer is supported on the negative electrode current collector by the following steps:

At least one surface (e. g. both surfaces) of the negative electrode current collector is (are) coated with a negative electrode active slurry, dried and cold pressed.

In some embodiments, the negative electrode film layer is supported on the substrate by the following steps:

The negative electrode active slurry is coated on either surface of the substrate, and dried.

In some embodiments, the negative electrode active slurry can be formulated by: dispersing components used to prepare the negative electrode active slurry, such as a negative electrode active material, a conductive agent, a binder, and any other components, in a solvent (e. g. deionized water) to form the negative electrode active slurry; as an example, the negative electrode active material may include at least one of the following materials: artificial graphite, natural graphite, soft carbon, hard carbon, silicon-based material, tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS). As an example, the conductive agent may be selected from at least one of superconducting carbon, acetylene black, carbon black, Ketjen black, carbon dot, carbon nanotube, graphene, and carbon nanofiber.

In some embodiments, the thickness of the negative electrode film layer supported on the negative electrode current collector and the thickness of the negative electrode film layer supported on the substrate are thicknesses of conventional negative electrode film layers in the art.

In some embodiments, the height of the raised structure is not greater than the thickness of the negative electrode film layer. As a result, the adjacent negative electrode film layers can be bonded more firmly by the conductive adhesive with the raised structure, so that the adjacent negative electrode film layers are kept from being easily unbonded and falling off, and the stability and safety of battery use are improved.

In some embodiments, the plurality of bonding points are uniformly provided on a surface of the negative electrode film layer. As a result, the adjacent negative electrode film layers can be bonded more uniformly and more firmly by the plurality of bonding points uniformly provided on the surface of the negative electrode film layer, so that the bonding sites are not easily unbonded and detached, and the stability and safety of battery use are improved.

In some embodiments, the surface of the negative electrode film layer is rectangular.

In some embodiments, the spacing between adjacent bonding points along the length direction of the negative electrode film layer is 30-50 mm; and/or the spacing between the adjacent bonding points along the width direction of the negative electrode film layer is 50-100 mm. As a result, the adjacent negative electrode film layers can further be bonded uniformly and firmly, and are not easily unbonded and detached.

In some embodiments, a bonding surface of the conductive adhesive with the raised structure is at least one selected from half-round, round and elliptical; optionally, the diameter or (elliptical) long diameter of the bonding surface of the conductive adhesive with the raised structure is not more than 4 mm. As a result, the bonding firmness of the bonding points can be improved, further ensuring that the adjacent negative electrode film layers are not easily unbonded and detached.

In some embodiments, the width of the gap between the negative electrode film layer supported on the negative electrode current collector and the negative electrode film layer supported on the substrate is not greater than the thickness of the negative electrode film layer. As a result, the problem that the adjacent negative electrode film layers are unbonded and detached due to the excessive gap width is avoided, and at the same time, the gap width between the adjacent negative electrode film layers helps to increase the infiltration rate during battery production, and to increase the rate of lithium intercalation reaction; and also, the gap width between the adjacent negative electrode film layers is suitable for counteracting part of expansion force, so that the expansion force during battery cycling is reduced, and the battery life is prolonged.

In some embodiments, the thickness of the negative electrode film layer supported on the negative electrode current collector is equal to the thickness of the negative electrode film layer supported on the substrate. As a result, the production process is facilitated, and the structural uniformity of the electrode sheet is maintained, so that the infiltration rate for the overall battery can be uniformly increased, the expansion force during battery cycling can be uniformly reduced, and the battery life can be further improved.

In some embodiments, the conductive adhesive is prepared by the following steps: an adhesive, a conductive material, and optionally a solvent are mixed; alternately, an adhesive, a functional auxiliary, and optionally a solvent are mixed, and the mixture is then mixed with a conductive material, optionally ground, filtered, and debubbled to obtain the conductive adhesive. Optionally, as an example, the adhesive may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS); and optionally, as an example, the conductive material is selected from at least one of metal (e. g. silver), graphite, and graphene. As a result, with the conductive adhesive, while maintaining a good conductivity, the adjacent negative electrode film layers can be bonded firmly, and are not easily unbonded and detached.

In some embodiments, the content of the adhesive in the conductive adhesive is suitable to provide sufficient adhesion, for example, the weight content of the adhesive in the conductive adhesive is 10%-35%, optionally 14%-30%, such as 19%, 20% and 29%.

In some embodiments, the conductive material may be provided in the form of a slurry containing the conductive material.

In some embodiments, the content of the conductive material in the conductive adhesive is suitable to provide sufficient and good conductivity, for example, the weight content of the conductive material in the conductive adhesive is 50%-80%, such as 60%.

In some embodiments, the functional auxiliary comprises a curing agent, an initiator, a coupling agent, a modified toughening agent, an anti-settling agent, and the like. As an example, the curing agent may be an allyl bisphenol A ether, and an aromatic amine. As an example, the initiator may be benzoyl peroxide. As an example, the coupling agent may be a KH-560 silane coupling agent. As an example, the modified toughening agent may be a hyperbranched polyester modified toughening agent. As an example, the anti-settling agent may be a polyamide wax. As an example, the remaining functional auxiliaries may be γ-(2,3-epoxypropoxy) propyltrimethoxysilane and 4-phenylimidazole.

In some embodiments, prior to bonding, metallic lithium is provided at non-bonding points on the negative electrode film layer supported by the negative electrode current collector; optionally, the metallic lithium is selected from at least one of a metallic lithium strip, a metallic lithium sheet and a metallic lithium powder. As a result, the lithium intercalation reaction can be accelerated, the occurrence of side reactions can be reduced, and the formation efficiency can be improved; after lithium intercalation reaction, metallic lithium disappears to form a gap, which helps to increase the infiltration rate of electrolyte solution for the battery and reduce the expansion force during battery cycling; the battery life is prolonged; and the metallic lithium is filled within the gap between the adjacent negative electrode film layers, so that air is effectively isolated from the contact reaction with the metallic lithium, and the problem of lithium-rich material failure is solved; and meanwhile, the lithium intercalation reaction takes place inside the electrode sheet, so that the SEI film on the surface of the electrode sheet has consistency, and the cycle life of the battery is improved.

In some embodiments, the two negative electrode film layers are bonded under the action of 0.1-0.5 Mpa (e. g. 0.3 MPa). As a result, it is possible to ensure that the adjacent negative electrode film layers are firmly bonded, while ensuring that there is a gap of an appropriate width between the adjacent negative electrode film layers at the non-bonding point, so that the infiltration rate of electrolyte solution during battery cycling is increased, and the expansion force during battery cycling is reduced.

In some embodiments, the negative electrode sheet of the first aspect of the present application is prepared by the method of the second aspect of the present application.

In some embodiments, the negative electrode current collector may be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE), etc.).

[Positive Electrode Sheet]

The positive electrode sheet typically includes a positive electrode current collector and a positive electrode film layer provided on at least one surface of the positive electrode current collector, wherein the positive electrode film layer comprises a positive electrode active material.

As an example, the positive electrode current collector has two opposite surfaces in its own thickness direction, and the positive electrode film layer is provided on either or both of the two opposite surfaces of the positive electrode current collector.

In some embodiments, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, the positive electrode active material may be a positive electrode active material known in the art for batteries. As an example, the positive electrode active material may include at least one of the following materials: lithium-containing phosphate with olivine structure, lithium transition metal oxide and their respective modified compounds. However, the present application is not limited to these materials, and other conventional materials useful as positive electrode active materials for batteries can also be used. These positive electrode active materials may be used alone or in combination of two or more thereof. Among them, examples of lithium transition metal oxide may include, but are not limited to, at least one of a lithium-cobalt oxide (such as $LiCoO_2$), a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, a lithium-nickel-cobalt-manganese oxide (such as $LiN_{1/3}Co_{1/3}Mn_{1/3}O_2$ (which may also be simply referred to as $NCM_{333}$), $LiNi_{0.5}Co_{0.2}Mn_{0.3}O_2$ (which may also be simply referred to as $NCM_{523}$), $LiNi_{0.5}Co_{0.25}Mn_{0.25}O_2$ (which may also be simply referred to as $NCM_{211}$), $LiNi_{0.6}Co_{0.2}Mn_{0.2}O_2$ (which may also be simply referred to as $NCM_{622}$), $LiNi_{0.8}Co_{0.1}Mn_{0.1}O_2$ (which may also be simply referred to as $NCM_{811}$), a lithium-nickel-cobalt-aluminum oxide (such as $LiNi_{0.85}Co_{0.15}Al_{0.05}O_2$), and a modified compound thereof, and the like. Examples of the lithium-containing phosphate with olivine structure may include, but are not limited to, at least one of a lithium iron phosphate (such as $LiFePO_4$ (which may also be simply referred to as LFP)), a composite material of lithium iron phosphate and carbon, a lithium manganese phosphate (such as $LiMnPO_4$), a composite material of lithium manganese phosphate and carbon, a lithium manganese iron phosphate, and a composite material of lithium manganese iron phosphate and carbon.

In some embodiments, the positive electrode film layer further optionally comprises a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode film layer further optionally comprises a conductive agent. As an example, the conductive agent may include at least one of superconducting carbon, acetylene black, carbon black, Ketjen black, carbon dot, carbon nanotube, graphene, and carbon nanofiber.

In some embodiments, the positive electrode sheet can be prepared by: dispersing the above-mentioned components for preparing the positive electrode sheet, for example, a positive electrode active material, a conductive agent, a binder and any other components in a solvent (e. g. N-methyl pyrrolidone) to form a positive electrode slurry; and coating the positive electrode slurry on a positive electrode current collector, and after drying, cold pressing and other procedures, the positive electrode sheet is obtained.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, the electrolyte is in a liquid state, and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro (oxalato)borate, lithium bis(oxalate)borate, lithium difluoro bis(oxalato)phosphate, and lithium tetrafluoro(oxalato) phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolyte solution further optionally comprises an additive. As an example, the additive may include a negative electrode film-forming additive, a positive electrode film-forming additive, and also an additive capable of improving certain properties of the battery, such as an additive for improving the overcharge performance of the battery, and an additive for improving the high-temperature or low-temperature performance of the battery, etc.

[Separator]

In some embodiments, a separator is further included in the secondary battery. The type of the separator is not particularly limited in the present application, and any well-known diaphragm with a porous structure having good chemical stability and mechanical stability may be selected.

In some embodiments, the material of the separator can be selected from at least one of glass fiber, non-woven cloth, polyethylene, polypropylene, and polyvinylidene fluoride. The separator may be a single-layer film or a multi-layer composite film, which is not particularly limited. When the separator is a multi-layer composite film, the material of each layer may be the same or different, which is not particularly limited.

In some embodiments, the positive electrode sheet, the negative electrode sheet, and the separator can be made into an electrode assembly by a winding process or a lamination process.

In some embodiments, the secondary battery may include an outer package. The outer package can be used to encapsulate the above-mentioned electrode assembly and the electrolyte.

In some embodiments, the outer package of the secondary battery may be a hard case, such as a hard plastic case, an aluminum case, a steel case, and the like. The outer package of the secondary battery can also be a soft pack, such as a bag-type soft pack. The material of the soft pack can be a plastic, and examples of the plastic include polypropylene, polybutylene terephthalate and polybutylene succinate, etc.

The shape of the secondary battery is not particularly limited in the present application, and it may be cylindrical, square, or any other shape. For example, FIG. 1 shows a secondary battery 5 with a square structure as an example.

Figure 2:
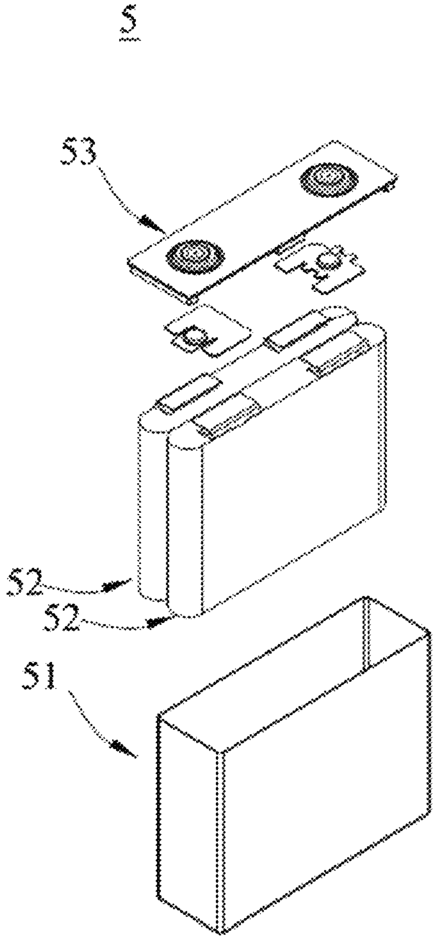
FIG. 2 is an exploded view of the secondary battery according to an embodiment of the present application shown in FIG. 1.

In some embodiments, referring to FIG. 2, the outer package may comprise a case 51 and a cover plate 53. Here, the case 51 can include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution infiltrates the electrode assembly 52. The number of electrode assemblies 52 comprised in the secondary battery 5 may be one or more, which can be selected by those skilled in the art according to specific actual requirements.

In some embodiments, secondary batteries can be assembled into a battery module, and the number of secondary batteries included in the battery module can be one or more, and the specific number can be selected by those skilled in the art according to the application and capacity of the battery module.

Figure 3:
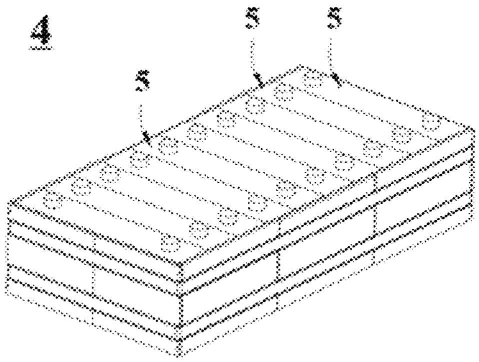
FIG. 3 is a schematic view of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangement is also possible. The plurality of secondary batteries 5 may further be fixed by fasteners.

Optionally, the battery module 4 can further include a case having an accommodating space, in which the plurality of secondary batteries 5 are accommodated.

In some embodiments, the battery module may further be assembled into a battery pack, and the number of battery modules contained in the battery pack may be one or more, and can be selected by those skilled in the art according to the use and capacity of the battery pack.

Figure 4:
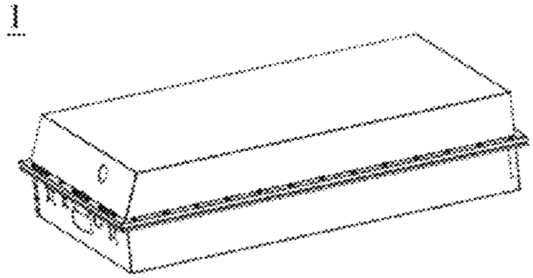
FIG. 4 is a schematic view of a battery pack according to an embodiment of the present application.
Figure 5:
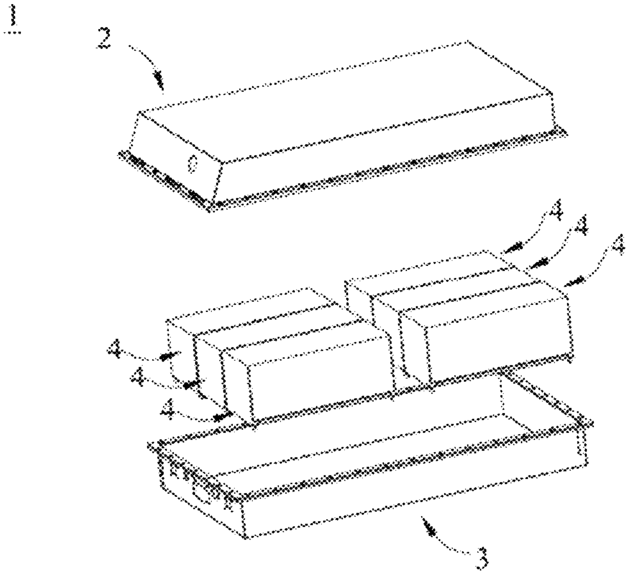
FIG. 5 is an exploded view of the battery pack according to an embodiment of the present application shown in FIG. 4.

FIGS. 4 and 5 show a battery pack 1 as an example. Referring to FIGS. 4 and 5, the battery pack 1 may comprise a battery box and a plurality of battery modules 4 provided in the battery box. The battery box comprises an upper box body 2 and a lower box body 3, wherein the upper box body 2 can cover the lower box body 3 and forms an enclosed space for accommodating the battery module 4. The plurality of battery modules 4 may be arranged in the battery box in any manner.

In addition, the present application further provides an electrical apparatus comprising at least one of the secondary battery, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus, the secondary battery, the battery module, or the battery pack can be selected according to its use requirements.

Figure 6:
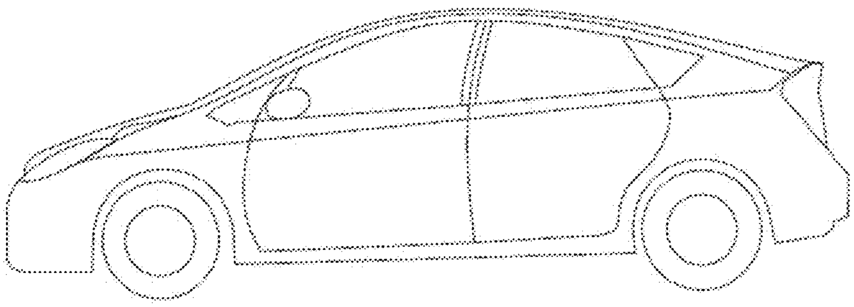
FIG. 6 is a schematic view of an electrical apparatus according to an embodiment of the present application in which a secondary battery is used as a power source.

FIG. 6 is an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

EXAMPLES

Examples of the present application will be described hereinafter. The examples described below are exemplary and only used to explain the present application, and should not be construed as a limitation on the present application. Where specific techniques or conditions are not specified in the examples, the techniques or conditions described in the literatures of the art or the product specifications are followed. Where manufacturers are not specified, the reagents or instruments used are conventional products and are commercially available.

Example 1 Preparation of Negative Electrode Sheet 1

1. Preparation of negative electrode active slurry: artificial graphite, silicon monoxide, conductive carbon black (SP) and PVDF (polyvinylidene fluoride) were mixed in a weight ratio of 95.5:1:1.5:2, and deionized water was added and stirred evenly to form the negative electrode active slurry;
2. Preparation of conductive adhesive (the following weight percentages are calculated based on the total weight of the conductive adhesive): 14.4% of styrene-butadiene rubber (SBR), 0.6% of allyl bisphenol A ether (curing agent) and 3% of hyperbranched polyester modified toughening agent were weighed and added into a high-speed mixer to be evenly mixed, then 5.5% of aromatic amine (curing agent), 0.5% of benzoyl peroxide (initiator), 0.3% of polyamide wax (anti-settling agent), 0.3% of KH-560 silane coupling agent, 0.2% of γ-(2,3-epoxypropoxy) propyltrimethoxysilane (BYK-111) functional auxiliary and 0.2% of 4-phenylimidazole (functional auxiliary) were added to continue to mix evenly, and then 75% of conductive silver slurry was added to the mixture in batches and fully stirred, and placed into a three-roll grinder for grinding and dispersion, and then filtered and vacuum debubbled to obtain the conductive adhesive;
3. Preparation of negative electrode sheet:

(1) A copper foil was used as a negative electrode current collector, the negative electrode active slurry was coated on both sides of the negative electrode current collector at a coating amount of 12 mg/cm$^2$, dried and cold pressed to obtain a negative electrode current collector with negative electrode film layers supported on both sides thereof;

(2) Two substrates made of polyethylene terephthalate (PET) having the same length and width as that of the negative electrode current collector were taken, and the negative electrode active slurry was coated on one surface of the substrate at a coating amount of 12 mg/cm$^2$, and dried to obtain a substrate having a negative electrode film layer supported on one side, with the thickness of the negative electrode film layer being equal to the thickness of the negative electrode film layer on the negative electrode current collector;

(3) Bonding points were provided on the negative electrode film layer of the negative electrode current collector, wherein 4 bonding points were provided in the width direction of the negative electrode film layer, the distance between adjacent bonding points along the length direction of the negative electrode film layer was 30 mm, and the distance between adjacent bonding points along the width direction of the negative electrode film layer was 50 mm; a conductive adhesive was sprayed onto a bonding point to form a conductive adhesive with an island-shaped structure, wherein the height of the island-shaped structure was not greater than the thickness of the negative electrode film layer; a bonding surface of the island-shaped structure was elliptical, and the long diameter of the bonding surface was 4 mm; a metallic lithium strip was placed at a part of non-bonding sites; then two substrates were respectively aligned with the front side and reverse side of the negative electrode current collector; the negative electrode film layer of the substrate was pressed towards the negative electrode film layer on the negative electrode current collector at 0.3 MPa, so that the adjacent negative electrode film layers were bonded by the conductive adhesive with the island-shaped structure, and there was a gap between the adjacent negative electrode film layers at non-bonding points, the width of the gap was not greater than the thickness of the negative electrode film layer; a metallic lithium strip was provided within some of the gaps (the thickness of the lithium strip was not greater than the width of the gap), the substrate on the negative electrode film layer was peeled off to obtain a negative electrode sheet 1, and the amount of lithium supplementing between the adjacent negative electrode film layers was 0.01 g/cm$^2$, calculated based on the area of a one-sided negative electrode film layer.

Figure 7:
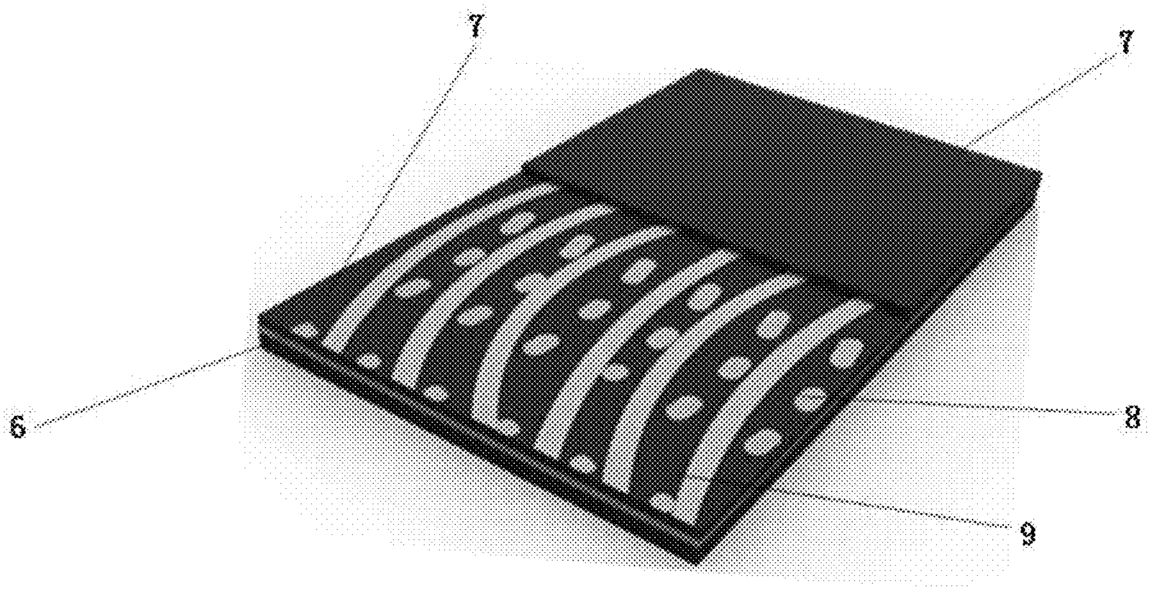
FIG. 7 is a half sectional view of a negative electrode sheet in Example 1 of the present application.

As shown in FIG. 7, the negative electrode sheet comprised a negative electrode current collector 6 and a negative electrode film layer 7, wherein both surfaces of the negative electrode current collector 6 were respectively superposedly provided with two negative electrode film layers 7, adjacent negative electrode film layers 7 were bonded at a plurality of bonding points by a conductive adhesive 8 with an island-shaped structure, there was a gap between the adjacent negative electrode film layers 7 at non-bonding points, and a metallic lithium strip 9 was provided within some of the gaps. The thicknesses of different negative electrode film layers 7 were equal, and the height of the conductive adhesive 8 with the island-shaped structure was not greater than the thickness of the negative electrode film layer 7; the plurality of bonding points were provided uniformly on the surface of the negative electrode film layer 7; the bonding surface of the conductive adhesive 8 with the island-shaped structure was elliptical; and the width of the gap between the adjacent negative electrode film layers 7 was not greater than the thickness of the negative electrode film layers 7.

Example 2 Preparation of Negative Electrode Sheet 2

1. As in 1 of Example 1;
2. Preparation of conductive adhesive: as in 2 of Example 1;
3. Preparation of negative electrode sheet:

(1)-(2) are as in (1)-(2) of 3 of Example 1;

(3) Bonding points were provided in the same manner as in (3) of 3 of Example 1; a conductive adhesive was sprayed onto a bonding point to form a conductive adhesive with an island-shaped structure, wherein the height of the island-shaped structure was not greater than the thickness of the negative electrode film layer; a bonding surface of the island-shaped structure was round, and the diameter of the bonding surface was 4 mm; a metallic lithium powder is uniformly spread on all or part of the non-bonding sites, then two substrates were respectively aligned with the front side and reverse side of the negative electrode current collector; the negative electrode film layer of the substrate was pressed towards the negative electrode film layer on the negative electrode current collector at 0.3 MPa, so that the adjacent negative electrode film layers were bonded by the conductive adhesive with the island-shaped structure, and there was a gap between the adjacent negative electrode film layers at non-bonding points, the width of the gap was not greater than the thickness of the negative electrode film layer; a metallic lithium powder was filled within some or all of the gaps; the substrate on the negative electrode film layer was peeled off to obtain a negative electrode sheet 2, and the amount of lithium supplementing between the adjacent negative electrode film layers was 0.02 g/$cm^2$, calculated based on the area of a one-sided negative electrode film layer.

Example 3 Preparation of Negative Electrode Sheet 3

The amount of lithium supplementing between the adjacent negative electrode film layers was 0.02 g/$cm^2$, calculated based on the area of a one-sided negative electrode film layer, the rest was the same as in Example 1, and the negative electrode sheet 3 was obtained.

Example 4 Preparation of Negative Electrode Sheet 4

1. As in 1 of Example 1;
2. Preparation of conductive adhesive (the following weight percentages are calculated based on the total weight of the conductive adhesive): 19.4% of polyacrylamide (PAM), 0.6% of allyl bisphenol A ether (curing agent) and 3% of hyperbranched polyester modified toughening agent were weighed and added into a high-speed mixer to be evenly mixed, then 5.5% of aromatic amine (curing agent), 0.5% of benzoyl peroxide (initiator), 0.3% of polyamide wax (anti-settling agent), 0.3% of KH-560 silane coupling agent, 0.2% of γ-(2,3-epoxypropoxy)propyltrimethoxysilane (BYK-111) functional auxiliary and 0.2% of 4-phenylimidazole (functional auxiliary) were added to continue to mix evenly, and then 70% of conductive silver slurry was added to the mixture in batches and fully stirred, and placed into a three-roll grinder for grinding and dispersion, and then filtered and vacuum debubbled to obtain the conductive adhesive;
3. Preparation of negative electrode sheet:

(1)-(2) are as in (1)-(2) of 3 of Example 1;

(3) Bonding points were provided on the negative electrode film layer of the negative electrode current collector, wherein 4 bonding points were provided in the width direction of the negative electrode film layer, the distance between adjacent bonding points along the length direction of the negative electrode film layer was 50 mm, and the distance between adjacent bonding points along the width direction of the negative electrode film layer was 50 mm; a conductive adhesive was sprayed onto a bonding point to form a conductive adhesive with an island-shaped structure, wherein the height of the island-shaped structure was not greater than the thickness of the negative electrode film layer; a bonding surface of the island-shaped structure was elliptical, and the long diameter of the bonding surface was 4 mm; a metallic lithium strip was placed at a part of non-bonding sites; then two substrates were respectively aligned with the front side and reverse side of the negative electrode current collector; the negative electrode film layer of the substrate was pressed towards the negative electrode film layer on the negative electrode current collector at 0.3 MPa, so that the adjacent negative electrode film layers were bonded by the conductive adhesive with the island-shaped structure, and there was a gap between the adjacent negative electrode film layers at non-bonding points, the width of the gap was not greater than the thickness of the negative electrode film layer; a metallic lithium strip was provided within some of the gaps (the thickness of the lithium strip was not greater than the width of the gap), the substrate on the negative electrode film layer was peeled off to obtain a negative electrode sheet 4, and the amount of lithium supplementing between the adjacent negative electrode film layers was 0.02 g/$cm^2$, calculated based on the area of a one-sided negative electrode film layer.

Example 5 Preparation of Negative Electrode Sheet 5

1. As in 1 of Example 1;
2. Preparation of conductive adhesive (the following weight percentages are calculated based on the total weight of the conductive adhesive): 29.4% of polymethacrylic acid (PMAA), 0.6% of allyl bisphenol A ether (curing agent) and 3% of hyperbranched polyester modified toughening agent were weighed and added into a high-speed mixer to be evenly mixed, then 5.5% of aromatic amine (curing agent), 0.5% of benzoyl peroxide (initiator), 0.3% of polyamide wax (anti-settling agent), 0.3% of KH-560 silane coupling agent, 0.2% of γ-(2,3-epoxypropoxy)propyltrimethoxysilane (BYK-111) functional auxiliary and 0.2% of 4-phenylimidazole (functional auxiliary) were added to continue to mix evenly, and then 60% of graphene was added to the mixture in batches and fully stirred, and placed into a three-roll grinder for grinding and dispersion, and then filtered and vacuum debubbled to obtain the conductive adhesive;
3. Preparation of negative electrode sheet:

(1)-(2) are as in (1)-(2) of 3 of Example 1;

(3) Bonding points were provided on the negative electrode film layer of the negative electrode current collector, wherein 4 bonding points were provided in the width direction of the negative electrode film layer, the distance between adjacent bonding points along the length direction of the negative electrode film layer was 50 mm, and the distance between adjacent bonding points along the width direction of the negative electrode film layer was 100 mm; a conductive adhesive was sprayed onto a bonding point to form a conductive adhesive with an island-shaped structure, wherein the height of the island-shaped structure was not greater than the thickness of the negative electrode film layer;

a bonding surface of the island-shaped structure was elliptical, and the long diameter of the bonding surface was 4 mm; a metallic lithium strip was placed at a part of non-bonding sites; then two substrates were respectively aligned with the front side and reverse side of the negative electrode current collector; the negative electrode film layer of the substrate was pressed towards the negative electrode film layer on the negative electrode current collector at 0.3 MPa, so that the adjacent negative electrode film layers were bonded by the conductive adhesive with the island-shaped structure, and there was a gap between the adjacent negative electrode film layers at non-bonding points, the width of the gap was not greater than the thickness of the negative electrode film layer; a metallic lithium strip was provided within some of the gaps (the thickness of the lithium strip was not greater than the width of the gap), the substrate on the negative electrode film layer was peeled off to obtain a negative electrode sheet 5, and the amount of lithium supplementing between the adjacent negative electrode film layers was 0.02 g/cm$^2$, calculated based on the area of a one-sided negative electrode film layer.

TABLE 1

Some parameters in Examples 1-5

| | Example 1 | Example 2 | Example 3 | Example 4 | Example 5 |
|---|---|---|---|---|---|
| Main components of conductive adhesive and their weight contents | SBR 14.4%; conductive silver slurry 75%; | SBR 14.4%; conductive silver slurry 75%; | SBR 14.4%; conductive silver slurry 75%; | PAM 19.4%; conductive silver slurry 70%; | PMAA 29.4%; graphene 60%; |
| Distance between adjacent bonding points in length direction | 30 | 30 | 30 | 50 | 50 |
| Distance between adjacent bonding points in width direction | 50 | 50 | 50 | 50 | 100 |
| Shape and size of bonding surface | Elliptical, long diameter 4 mm | Round, diameter 4 mm | Elliptical, long diameter 4 mm | Elliptical, long diameter 4 mm | Elliptical, long diameter 4 mm |
| Amount of lithium supplementing between adjacent negative electrode film layers | 0.01 g/cm$^2$ | 0.02 g/cm$^2$ | 0.02 g/cm$^2$ | 0.02 g/cm$^2$ | 0.02 g/cm$^2$ |
| Bonding pressure | 0.3 Mpa | 0.3 Mpa | 0.3 Mpa | 0.3 Mpa | 0.3 Mpa |

Example 6 Preparation of Secondary Battery

A ternary material (NCM811) was directly used as a positive electrode material, and specifically, NCM811, conductive carbon black, carbon nanotube, PVDF, and a dispersant was mixed in a weight ratio of 96.5:1.5:0.3:1:0.5, and N-methyl pyrrolidone solvent was added and stirred uniformly to form a positive electrode slurry with a solid content of 60%; an aluminum foil was used as a current collector, and the positive electrode slurry was coated onto the current collector, with a coating width of 200 mm, a coating length of single battery cell of 9450 mm and a coating density of 20 mg/cm$^2$, coating was performed on both sides, and after drying and then roller pressing, a positive electrode sheet was obtained.

The negative electrode sheets 1-5 of Examples 1 to 5 were used, respectively with the positive electrode sheet as described above and a diaphragm with a thickness of 12 μm; the negative substrate, the diaphragm, and the positive electrode sheet were wound and tab welded, and assembled into a battery cell, and after injecting a liquid (the electrolyte solution was the same as that in Test Example 1), the battery cell was charged for the first time, and standby secondary batteries 1-5 were obtained with a cell capacity of 100 Ah.

Comparative Example 1

According to the method of Example 3, a negative electrode active slurry was prepared first, and then a negative electrode current collector with negative electrode film layers supported on the front side and reverse side thereof was prepared, namely, a negative electrode sheet; and with the obtained negative electrode sheet, a secondary battery A was prepared according to the method of Example 6.

Comparative Example 2

No conductive adhesive was used; a negative electrode active slurry and a negative electrode current collector with negative electrode film layers supported on the front side and reverse side thereof were prepared according to the method of Example 3; a metallic lithium layer was plated on the negative electrode film layers on the front side and reverse side of the negative electrode current collector, and then the negative electrode active slurry was coated on the surfaces of the two metallic lithium layers at a coating amount of 12 $mg/cm^2$, and dried to obtain a negative electrode sheet B, wherein the amount of lithium supplementing of the electrode sheet was the same as in Example 3.

A secondary battery B was prepared according to the method of Example 6.

Test Example 1 Infiltration Measurement

Negative electrodes 1-5 and negative electrode sheets A-B were measured for Infiltration, and specifically: 100 g of an electrolyte solution was poured into a container, a electrode sheet was hung vertically, and the bottom edge of the electrode sheet just touched the surface of the electrolyte solution; the liquid climbing height of the electrolyte solution after a certain time was measured, and the infiltration rate was calculated according to the following formula, see Table 2 for the results. Here, the electrolyte solution was prepared by formulating ethylene carbonate (EC), ethyl methyl carbonate (EMC) and diethyl carbonate (DEC) into a solution in a volume ratio of 1:1:1, and dissolving $LiPF_6$ uniformly in the above solution to obtain the electrolyte solution, wherein the concentration of $LiPF_6$ was 1 mol/L.

Infiltration rate=liquid climbing height/liquid climbing time

TABLE 2

Results of infiltration measurement

| Sample | Infiltration rate (mm/h) |
|---|---|
| Example 1 | 19.1 |
| Example 2 | 18.6 |
| Example 3 | 19.3 |
| Example 4 | 21.6 |
| Example 5 | 20.8 |
| Comparative Example 1 | 14.2 |
| Comparative Example 2 | 15.4 |

It can be seen from table 2 that, compared with the Comparative Examples 1-2, the infiltration rate of the negative electrode sheet of the present application was increased by about 25%-35%, indicating that the infiltration property of the negative electrode sheet of the present application was significantly improved.

Test Example 2 Measurement of Expansion Force During Battery Cycling

The negative electrode sheets 1-5 and the negative electrode sheets A-B were respectively used to obtain secondary batteries according to Example 6; the batteries were charged and discharged for 1000 cycles at 1C/1C under clamping by a fixture (the initial clamping force was 3000N), and after cycling, the expansion force of the battery was measured by a pressure sensor provided on the fixture, see Table 3 for the results.

TABLE 3

Measurement results of expansion force during battery cycling

| Sample | Expansion force (N) |
|---|---|
| Example 1 | 1612 |
| Example 2 | 1703 |
| Example 3 | 1642 |
| Example 4 | 1733 |
| Example 5 | 1672 |
| Comparative Example 1 | 2172 |
| Comparative Example 2 | 2049 |

Table 3 shows that, compared with Comparative Examples 1-2, the expansion force of the battery prepared with the negative electrode sheet of the present application was reduced by about 20%-26%, indicating that the expansion force of the battery prepared with the negative electrode sheet of the present application was significantly reduced during cycling.

Test Example 3 Battery Life

Secondary batteries prepared with the negative electrode sheets 1-5 and the negative electrode sheets A-B were test for battery life, and specifically, the negative electrode sheets were used to prepared secondary batteries according to Example 6, the batteries were charged and discharged for 1000 cycles at 1C/1C under clamping by a fixture, the initial capacity of the battery before cycling and the remaining capacity after cycling was measured, and the percentage of the remaining capacity of the battery was calculated according to the following formula, see Table 4 for the results.

Percentage of remaining capacity=remaining capacity/initial capacity

TABLE 4

Measurement results of battery life

| Sample | Percentage of remaining capacity |
|---|---|
| Example 1 | 99.1% |
| Example 2 | 99.5% |
| Example 3 | 99.7% |
| Example 4 | 99.3% |
| Example 5 | 99.3% |
| Comparative Example 1 | 92.2% |

Table 4 shows that, compared with Comparative Example 1, the percentage of the remaining capacity of the battery prepared with the negative electrode sheet of the present application after 1000 cycles was increased by 7.8%, indicating that the cycle life of the battery prepared with the negative electrode sheet of the present application was significantly improved.

It should be noted that the present application is not limited to the embodiments above. The above-described embodiments are merely exemplary, and embodiments having substantially the same technical idea and the same effects within the scope of the technical solution of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A negative electrode sheet, comprising a negative electrode current collector and a negative electrode film layer, wherein the negative electrode film layer comprises a plurality of negative electrode film layers, at least one surface of the negative electrode current collector is superposedly provided with two or more of the plurality of negative electrode film layers, the negative electrode film layers that are adjacent are bonded at a plurality of bonding points by a conductive adhesive having a raised structure, and there is a gap between the negative electrode film layers that are adjacent at non-bonding points, and wherein a spacing between the bonding points that are adjacent along a length direction of the negative electrode film layer is in a range of 30-50 mm; and/or a spacing between the bonding points that are adjacent along a width direction of the negative electrode film layer is in a range of 50-100 mm.

2. The negative electrode sheet according to claim 1, wherein a height of the raised structure is not greater than a thickness of one of the negative electrode film layers that are adjacent.

3. The negative electrode sheet according to claim 1, wherein the plurality of the bonding points is uniformly provided on a surface of the negative electrode film layer.

4. The negative electrode sheet according to claim 1, wherein a bonding surface of the conductive adhesive having the raised structure is at least one selected from half-round, round or elliptical;

optionally, a diameter or long diameter of the bonding surface of the conductive adhesive having the raised structure is not greater than 4 mm.

5. The negative electrode sheet according to claim 1, wherein a width of the gap between the negative electrode film layers that are adjacent is not greater than a thickness of one of the negative electrode film layers that are adjacent.

6. The negative electrode sheet according to claim 1, wherein two of the plurality of negative electrode film layers have an equal thickness.

7. The negative electrode sheet according to claim 1, wherein the conductive adhesive comprises an adhesive and a conductive material;

optionally, the conductive material comprises at least one selected from the group consisting of metal, graphite, and graphene.

8. The negative electrode sheet according to claim 1, further comprising metallic lithium filled within the gap between the negative electrode film layers that are adjacent;

optionally, the metallic lithium comprises at least one selected from the group consisting of a metallic lithium strip, a metallic lithium sheet and a metallic lithium powder.

9. A method for preparing a negative electrode sheet, comprising the following steps:

(1) arranging a plurality of bonding points on a negative electrode film layer supported by a negative electrode current collector, and coating a conductive adhesive having a raised structure at the bonding points;

(2) bonding a negative electrode film layer supported by a substrate and the negative electrode film layer supported by the negative electrode current collector under an action of pressure by the conductive adhesive having the raised structure, and leaving a gap at non-bonding points, and peeling off the substrate to obtain the negative electrode sheet;

optionally, repeating steps (1) to (2), wherein a spacing between the bonding points that are adjacent along a length direction of the negative electrode film layer is in a range of 30-50 mm; and/or a spacing between the bonding points that are adjacent along a width direction of the negative electrode film layer is in a range of 50-100 mm.

10. The method according to claim 9, wherein a height of the raised structure is not greater than a thickness of the negative electrode film layer supported by the substrate.

11. The method according to claim 9, wherein the plurality of the bonding points are uniformly provided on a surface of the negative electrode film layer supported by the negative electrode current collector.

12. The method according to claim 9, wherein a bonding surface of the conductive adhesive having the raised structure is at least one selected from half-round, round or elliptical;

optionally, a diameter or long diameter of the bonding surface of the conductive adhesive having the raised structure is not greater than 4 mm.

13. The method according to claim 9, wherein a width of the gap is not greater than a thickness of the negative electrode film layer supported by the substrate.

14. The method according to claim 9, wherein the negative electrode film layer supported by the negative electrode current collector and the negative electrode film layer supported by a substrate have an equal thickness.

15. The method according to claim 9, wherein the conductive adhesive comprises an adhesive and a conductive material;

optionally, the conductive material comprises at least one selected from the group consisting of metal, graphite, and graphene.

16. The method according to claim 9, wherein prior to bonding, metallic lithium is provided at non-bonding points on the negative electrode film layer supported by the negative electrode current collector;

optionally, the metallic lithium comprises at least one selected from the group consisting of a metallic lithium strip, a metallic lithium sheet and a metallic lithium powder.

17. The method according to claim 9, wherein the negative electrode film layer supported by the negative electrode current collector and the negative electrode film layer supported by a substrate are bonded under a pressure of 0.1-0.5 Mpa.

18. A secondary battery comprising the negative electrode sheet according to claim 1.

19. A battery module comprising the secondary battery of claim 18.

20. A battery pack comprising the battery module of claim 19.

21. An electrical apparatus, comprising the battery pack of claim 20.

* * * * *